US007907632B2

(12) United States Patent
Urano et al.

(10) Patent No.: US 7,907,632 B2
(45) Date of Patent: Mar. 15, 2011

(54) DATA OUTPUT APPARATUS, COMMUNICATION APPARATUS AND SWITCH APPARATUS

(75) Inventors: Hiroshi Urano, Kawasaki (JP); Toshihiro Koji, Kawasaki (JP); Masayuki Ogawa, Kawasaki (JP); Kenji Fukunaga, Kawasaki (JP); Tamotsu Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 12/339,821

(22) Filed: Dec. 19, 2008

(65) Prior Publication Data
US 2009/0296729 A1    Dec. 3, 2009

(30) Foreign Application Priority Data
May 30, 2008    (JP) .................................. 2008-142000

(51) Int. Cl.
*H04J 3/16*    (2006.01)
(52) U.S. Cl. ...................................... 370/468
(58) Field of Classification Search ........................ None
See application file for complete search history.

(56) References Cited

U.S. PATENT DOCUMENTS

| 7,313,144 | B2 | 12/2007 | Kobayashi et al. |
| 7,675,926 | B2 * | 3/2010 | Olsen et al. ................... 370/412 |
| 2002/0087618 | A1 * | 7/2002 | Bohm et al. ................... 709/201 |
| 2005/0094643 | A1 * | 5/2005 | Wang et al. ................. 370/395.4 |
| 2006/0062233 | A1 * | 3/2006 | Brewer et al. ................. 370/412 |
| 2007/0121499 | A1 * | 5/2007 | Pal et al. ........................ 370/230 |
| 2007/0147422 | A1 |  6/2007 | Urano et al. |

FOREIGN PATENT DOCUMENTS

| JP | 2005-184709 | 7/2005 |
| JP | 2005-268846 | 9/2005 |
| JP | 2007-181085 | 7/2007 |

* cited by examiner

*Primary Examiner* — Chirag G Shah
*Assistant Examiner* — Amarnauth Persaud
(74) *Attorney, Agent, or Firm* — Fujitsu Patent Center (57) ABSTRACT

A data communication apparatus has a data retainer, a retain state manager, a guaranteed bandwidth manager, a surplus bandwidth manager managing outputting of output data having a destination retained in the data retainer to an output line on a per-destination basis when the output data is outputted to the output line with the use of a surplus bandwidth that is a surplus over a sum of guaranteed bandwidths, and a scheduler scheduling outputting of data retained in the data retainer to the output line, based on results of managements by the guaranteed bandwidth manager and the surplus bandwidth manager and a retain state managed by the retain state manager. The apparatus manages the bandwidth with improved accuracy at the time of communication using a surplus bandwidth.

14 Claims, 8 Drawing Sheets

DATA OUTPUT APPARATUS, COMMUNICATION APPARATUS AND SWITCH APPARATUS

CROSS-REFERENCE TO RELATED APPLICATION(S)

This application is based upon and claims the benefit of priority of the prior Japanese Application No. 2008-142000 filed on May 30, 2008 in Japan, the entire contents of which are hereby incorporated by reference.

FIELD

The embodiment(s) discussed herein relates to a data output apparatus, a communication apparatus and a switch apparatus.

BACKGROUND

In a Layer-2 switch in an Internet Protocol (IP) network, performed is bandwidth management that controls output bandwidths of packets on a per-queue basis. Namely, a queue is set for each user terminal which is a destination, and a bandwidth of output packets in each queue is managed. Quality of Service (QOS: priority control, band control, etc.) for each user terminal is accomplished by the bandwidth management.

The QOS service guarantees a network user band to each user terminal under the contract (referred to as bandwidth guarantee). To guarantee the bandwidth, performed is a queue control based on, for example, token bucket. In bandwidth management for a plurality of queues, a token bucket is provided for each queue, packets are stored in a relevant queue, and when a token is left in the token bucket, outputting of a packet in the queue is permitted.

In a token bucket for each queue, bytes in number (bandwidth value) that can be outputted for a predetermined time period are accumulated according to a bandwidth (guaranteed bandwidth value) in which the communication is guaranteed under the contract or the like. This value is added at intervals of a predetermined time (referred to as cyclic update), whereas the number of outputted bytes are subtracted when outputting is requested (referred to as read update). As this, the guaranteed bandwidth is managed and controlled (on a per-queue basis).

After packets in each queue corresponding to the guaranteed bandwidth are outputted under the bandwidth management with the use of the token bucket, the token bucket is empty. However, when the bandwidth of the output line has a surplus even after a communication corresponding to the guaranteed bandwidth is made, a surplus bandwidth generates.

Namely, when the values of token buckets are zero or less, or no packets are stored in all queues before the token buckets are added and updated in the cyclic update, an empty time generates. A section of this empty time is called a surplus bandwidth because this empty time generates after the set bandwidth is satisfied.

When there still remains a queue in which a packet(s) is stored in such occasion, a communication can be made by using the surplus bandwidth. Namely, the surplus bandwidth can be distributed to the users to provide further service to the users.

In order to improve the quality of the communication service to the users, the bandwidth management with higher accuracy is demanded even at the time of a communication using a surplus bandwidth while considering demands from the users of accommodated user terminals.

[Patent Document] Japanese Patent Application Laid-Open Publication No. 2005-268846

[Patent Document] Japanese Patent Application Laid-Open Publication No. 2005-184709

[Patent Document] Japanese Patent Application Laid-Open Publication No. 2007-181085

SUMMARY

An object of the embodiment is to perform bandwidth management with improved accuracy at the time of communication using a surplus bandwidth.

Another object of the embodiment is to provide working effects that are brought by configurations disclosed in the best mode for carrying out the invention to be described later, not attained by the known techniques, in addition to the above object.

In an aspect, the embodiment provides:

(1) A data output apparatus comprising a data retainer that retains inputted output data to an output line for each destination thereof, a retain state manager that manages a retain state of the output data for each destination in the data retainer, a guaranteed bandwidth manager that manages outputting of the output data to the output line retained in the data retainer within a guaranteed bandwidth given to the destination on a per-destination basis, a surplus bandwidth manager that manages the outputting of the output data to the output line retained in the data retainer on the per-destination basis when the output data is outputted to the output line by using a surplus bandwidth that is a surplus over a sum of the guaranteed bandwidths, and a scheduler that schedules outputting of data retained in the data retainer to the output line, based on results of managements by the guaranteed bandwidth manager and the surplus bandwidth manager and the retain state managed by the retain state manager.

In another aspect, the embodiment provides:

(2) A communication apparatus comprising the data output apparatus in (1).

In still another aspect, the embodiment provides:

(3) A switch apparatus comprising a plurality of communication apparatuses connected to a packet network, a Layer 2 switch connected among the plural communication apparatuses, and a data output apparatus in (1) provided in at least one of the plural communication apparatus.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

Hereinafter, description will be made of embodiments of the present invention with reference to the accompanying drawings. Note that the embodiments described hereinafter are merely illustrative, not having an intention to exclude various modifications or applications of the technique. Namely, the disclosed embodiments may be modified in various ways (for example, combining the embodiments) within a range not departing from the scope and spirit of the invention.

[A] First Embodiment

[A1] COMPARED EXAMPLE

Figure 2:
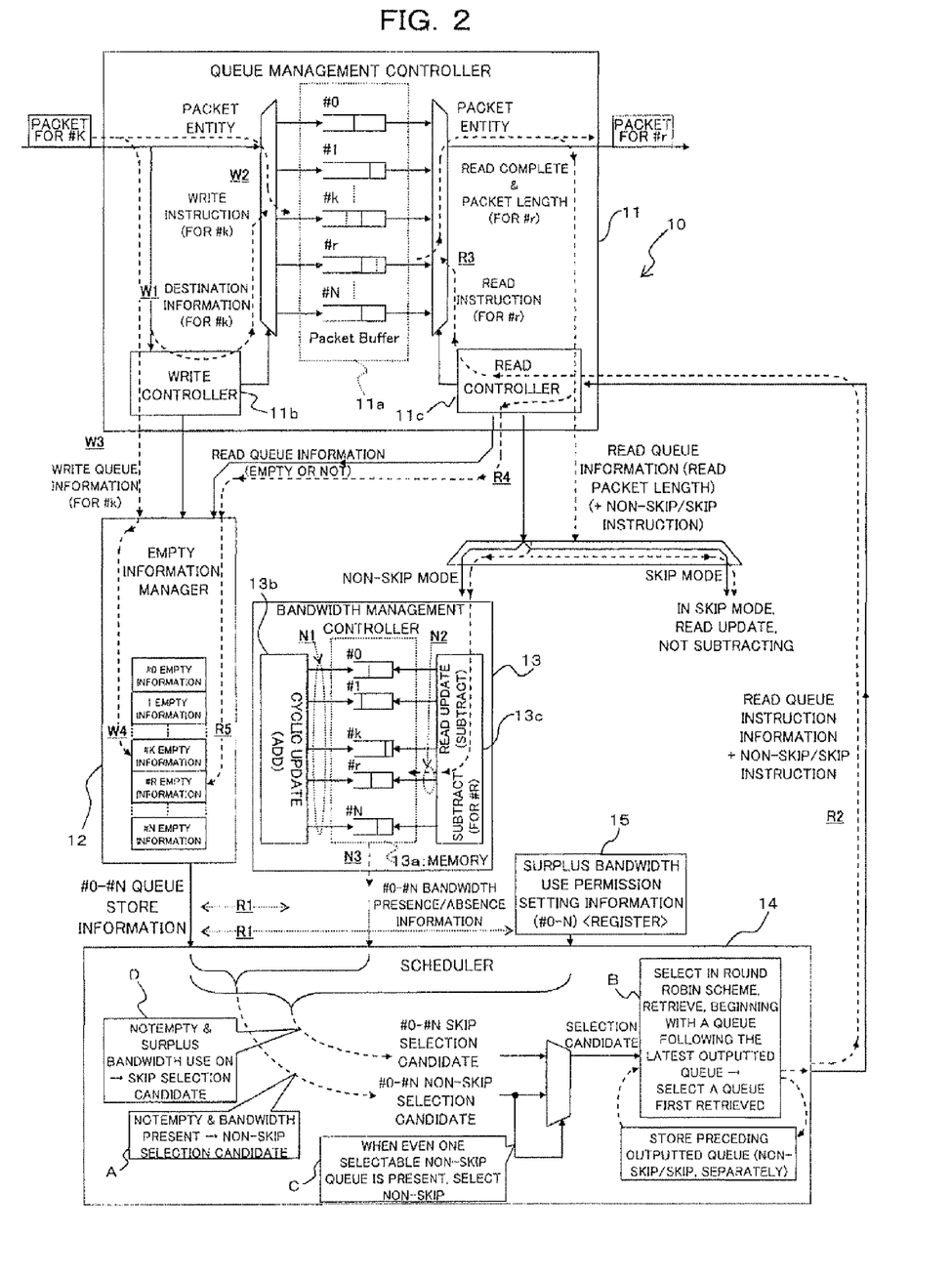
FIG. 2 is a diagram illustrating a data output apparatus as an example of configuration to be compared.

In the case of communications with the use of a surplus bandwidth, distribution of the best effort type is general as the manner of distributing a bandwidth to each queue, where the first-come queue is permitted to use the bandwidth. FIG. 2 is a diagram illustrating a data output apparatus as an example to be compared with a first embodiment of this invention to be described later.

Figure 1A:
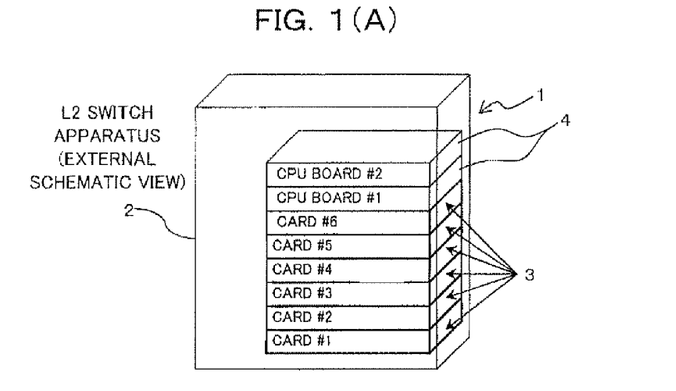
FIGS. 1(A) and 1(B) are diagrams illustrating a Layer 2 switch apparatus.
Figure 1B:
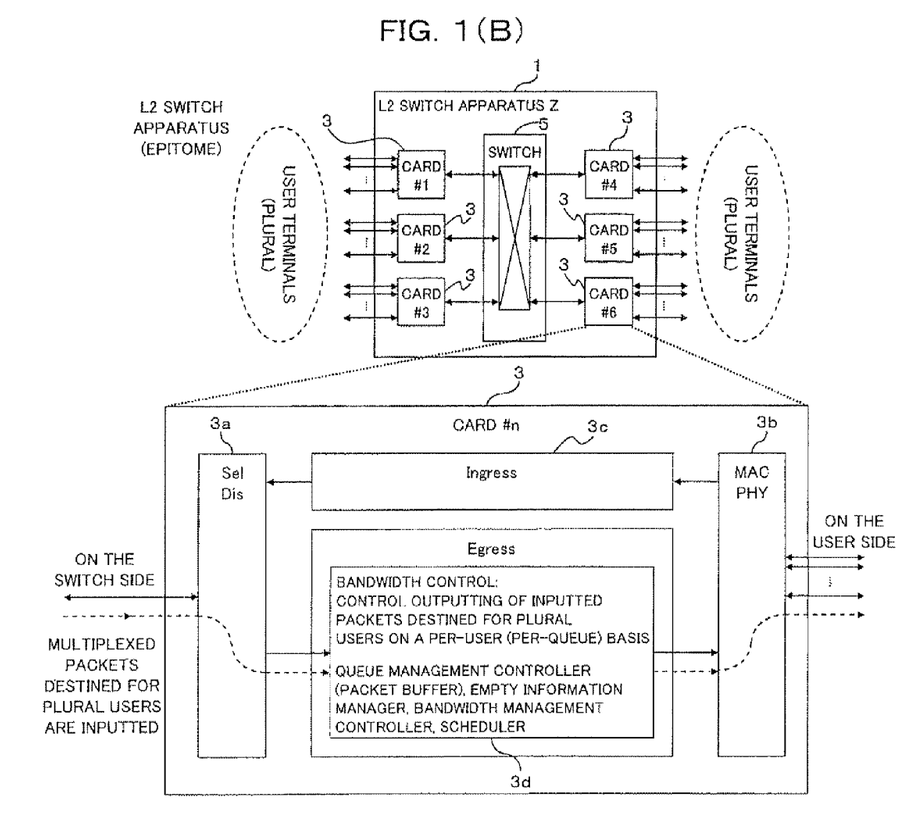

The data output apparatus 10 illustrated in FIG. 2 is applied to a Layer 2 switch apparatus (switch apparatus) 1 illustrated in FIGS. 1(A) and 1(B). In the Layer 2 switch apparatus 1, a plurality (six: #1 to #6) of cards (communication apparatuses) 3 and a plurality of CPU boards (two: #1 and #2) are mounted in a casing 2 as illustrated in FIG. 1(A), for example, together accomplishing a function as a Layer 2 (L2) switch illustrated in FIG. 1(B).

Each of the cards 3 is connected to a packet network to receive and transmit packet data (packet entity data) from and to a plurality of user terminals. A switch (Layer 2 switch) 5 is interposed among the cards 3, through which packet data is exchanged among the cards 3.

For example, packet data inputted to the card 3 (#1) over a packet network from a user terminal not illustrated can be led to the card 3 (#6) through the switch 5. The card 3 (#6) transfers the packet data from the switch 5 to another user terminal which is the destination.

Each of the cards 3 has interfaces 3a and 3b, and a first processor 3c and a second processor 3d as illustrated in FIG. 1(B). The interface 3a performs an interface conversion process and the like with the side of the switch 5. The interface 3b performs a signal interface process with the side of the user terminal.

The first processor 3c processes packet data inputted from the side of a user terminal via the interface 3b, and outputs the packet data to the side of the switch 5 via the interface 3a. The second processor 3d processes packet data inputted from the side of the switch 5 via the interface 3a, and outputs the packet data to the side of a user terminal (output line) via the interface 3b.

The second processor 3d performs, for example, a bandwidth control as a QOS process in the Layer 2 switch 1. The bandwidth control is a control on outputting of inputted packets destined for a plurality of users on a per-destined-user basis (on a per-queue basis). When packet data switched by the switch 5 is outputted to be transferred to a user terminal as done in the card 3 (#6), the bandwidth control is performed under bandwidth guarantee that guarantees a communication bandwidth to each user according to the contract, as the above-noted bandwidth control.

The data output apparatus 10 illustrated in FIG. 2 can be applied as the second processor 3d that can be mounted on each of the above-mentioned cards 3. The data output apparatus 10 functioning as the second processor 3d can accomplish a communication with a user terminal that is a destination within a guaranteed bandwidth, and can accomplish surplus bandwidth distribution of the best effort type.

The data output apparatus 10 illustrated in FIG. 2 comprises a queue management controller 11, an empty information manager 12, a bandwidth management controller 13 and a scheduler 14.

The queue management controller 11 is inputted thereto packet data that is output data to an output line from the switch 5 (refer to FIG. 1(B)), and retains the packet data in a packet buffer 11a having queues provided for respective destinations of packet data. Here, the packet buffer 11a is provided with N queues (#1 to #N) so as to retain packet data destined for a plurality (N) of user terminals.

In addition to the above-mentioned packet buffer 11a, the queue management controller 11 has a write controller 11b which controls writing of packet data into the packet buffer 11a and a read controller 11c which controls reading-out of packet data from the same.

The write controller 11b writes inputted packet data into a memory area (queue) according to a destination of the packet data in the packet buffer 11a. The read controller 11c reads packet data retained in a relevant queue according to instruction information about a queue to be read out given from the scheduler 14 to be described later. The read out packet data is outputted to an output line not illustrated.

The empty information manager 12 manages a retain state of packet data for each destination, that is, in each of the queues #1 to #N, in the packet buffer 11a. In concrete, the empty information manager 12 can be accomplished with memory elements having memory areas in each of which bit information representing whether packet data is retained or not in a relevant queue #1, #2, . . . or #N is stored.

The band management controller 13 manages each surplus obtained by subtracting an output bandwidth of packet data outputted to the output line having a destination from a guaranteed bandwidth given to the destination, that is, a corresponding queue, as a remainder guaranteed bandwidth (token bucket) For this purpose, the bandwidth management controller 13 has a memory 13a, an adder 13b and a subtracter 13c to manage the remainder guaranteed bandwidth for each destination.

The memory 13a stores a value of the remainder guaranteed bandwidth for each destination. The adder 13b adds a value of the guaranteed bandwidth per unit time that is given to each destination to a value of the remainder guaranteed bandwidth of a corresponding destination to update the value of the remainder guaranteed bandwidth.

The subtracter 13c subtracts a bandwidth value of each destination of data having been outputted from each queue in the packet buffer 11 to the output line from a value of the remainder guaranteed bandwidth of a corresponding destination stored in the memory 13a to update the value of the remainder guaranteed bandwidth.

The bandwidth management controller 13 sets a guaranteed bandwidth for each destination in the memory 13a, obtains, by means of the subtracter 13c, a difference value between a value of this guaranteed bandwidth and a value of a bandwidth of packet data for a destination read out by the read controller 11c and outputted to the output line, and manages this difference value as a value of the token bucket, thereby securing a bandwidth that a user terminal of each destination is guaranteed.

The scheduler 14 schedules outputting of packet data retained in the packet buffer 11a under the band management by the band management controller 13 on a per-packet basis (Packet by Packet). The scheduling by the scheduler 14 is classified into scheduling in a mode using a remainder guaranteed bandwidth (remainder guaranteed band use mode) and scheduling in a surplus bandwidth use mode.

The remainder guaranteed bandwidth use mode is an operation mode performed when it is found by the bandwidth management controller 13 managing the bandwidths by referring values of the remainder guaranteed bandwidths that a queue having a remainder guaranteed bandwidth is present and packet data is retained in this queue. On the other hand, the surplus band use mode is an operation mode performed when no queues having a remainder guaranteed bandwidth are present but packet data is retained in (a) queue(s).

The scheduler 14 outputs an instruction about a queue to be read out to the read controller 11c through the scheduling in either one of the above-mentioned operation modes. When receiving the instruction to read out the queue, the read controller 11c reads packet data retained in the queue indicated by the instruction, and transfers the packet data to the output line.

The packet transferring process is performed through a packet writing process and a packet reading process as described below, for example.

Packet Writing Process

For example, when packet data (destined for a user terminal #k) is inputted from the switch 5 (refer to FIG. 1(b)) (refer to W1 in FIG. 2), the write controller 11b of the queue management controller 11 extracts destination information (#k) contained in the packet data.

The write controller 11b stores the packet data in a queue corresponding to the destination (#k) in the packet buffer 11a on the basis of the extracted destination information (#k) (refer to W2 in FIG. 2). The write controller 11b notifies the empty information manager 12 of the destination information (#k) about the packet data stored in the packet buffer 11a (refer to W3 in FIG. 2), while storing the packet data in the packet buffer 11a.

The empty information manager 12 registers information representing that the packet data destined for the destination (#k) is stored in the packet buffer 11a, associating the packet data with the destination information notified from the write controller 11b (refer to W4 in FIG. 2).

Packet Reading Process

When the packet data written in the packet buffer 11a is read out as stated above, the scheduler 14 performs the following process, for example. The scheduler 14 refers to the empty information manager 12 to obtain information about a queue in which the packet data is stored in the packet buffer 11a.

Namely, the scheduler 14 receives notification of a retain state (that is, state of retain (Not empty) or non-retain (Empty)) of packet data in all queues from the empty information manager 12.

The scheduler 14 receives information about remainder guaranteed bandwidths (token buckets) of all queues from the bandwidth management controller 13, together with surplus band usage setting information about each destination user terminal set in a setting register 15. Incidentally, the surplus bandwidth usage setting information is stored as bit data in the setting register 15, and is about whether each user terminal can use a surplus bandwidth resource that is a remainder obtained by subtracting a bandwidth of the output line from the guaranteed bandwidth.

The scheduler 14 performs scheduling to read out packet data in a queue having a remainder guaranteed bandwidth on the basis of the information from the empty information manager 12 and the information from the bandwidth management controller 13 (refer to R1 in FIG. 2).

Concretely, when a remainder guaranteed bandwidth is present and packet data is stored in a queue having this remainder guaranteed bandwidth, the scheduler 14 instructs the read controller 11c to read out the packet data (Non-skip mode, refer to A and R2 in FIG. 2). When there are a plurality of queues having remainder guaranteed bandwidths in which packet data is stored, the scheduler 14 selects one of the queues in the simple round robin scheme, and gives a read instruction (refer to B in FIG. 2).

When a queue having a remainder guaranteed bandwidth is present and packet data is stored in this queue, the scheduler 14 performs the scheduling so that the packet data in the queue is read out and outputted, preferentially. In other words, the scheduler 14 selects the Non-Skip mode when being able to select only one Non-skip queue having a remainder guaranteed bandwidth (refer to C in FIG. 2).

When no queues having a remainder guaranteed bandwidth remain but packet data is retained in a queue that is permitted to use a surplus bandwidth in the setting register 15, the scheduler 14 outputs an instruction about a queue to be read out in order to read packet data in this queue.

In other words, when all queues in which packet data is stored have used up their remainder guaranteed bandwidths, the scheduler 14 performs scheduling so as to read out packet data in a queue whose surplus bandwidth use setting is ON among these queues (refer to D in FIG. 2).

On this occasion, when plural queue are selectable, the scheduler 14 successively selects queues one by one in the simple round robin scheme, too. The scheduler 14 notifies the read controller 11c of a selected queue as read queue indication information (Skip mode, refer to R2 in FIG. 2).

When receiving an instruction to read a queue from the scheduler 14, the read controller 11c of the queue management controller 11 reads out packet data in the queue (refer to R3 in FIG. 2). In the case illustrated in FIG. 2, the read controller 11c receives an instruction to read packet data destined for the user terminal (#r), for example. Accordingly, packet data destined for the user terminal #r is read out from a queue storing the packet data therein.

The read controller 11c extracts read packet length information from the packet data read out from the packet buffer 11a, and notifies the empty information manager 12 of information (read queue information) on a queue from which the packet data has been read out in the packet buffer 11a. The read controller 11c notifies the bandwidth management controller 13 of the extracted packet length information together with the above read queue information (refer to R4 in FIG. 2).

The empty information manager 12 updates the retain state of a queue corresponding to the notified read queue information (refer to R5 in FIG. 2). In concrete, when the queue from which the packet data has been read out becomes empty, the empty information manager 12 registers information representing that the queue is empty (information representing non-retain state, Empty information). On the other hand, when packet data is still retained in the queue even after the packet data has been read out, the empty information manager 12 keeps holding information representing the retain state (Not Empty information).

Alternatively, the empty information manager 12 may retain the number of packets retained in each queue as count information. Namely, when the count information is "0", the queue is in the non-retain state, whereas when the count information is a value of not "0" but "1" or more, the queue is in the retain state.

Bandwidth Management Controlling Process

When transfer using a remainder guaranteed band is performed (Non-Skip Mode) in the above-noted packet data reading process, the remainder guaranteed bandwidth managed by the bandwidth management controller 13 is updated as follows.

The adder 13b adds a token amount corresponding to a value (for example, the number of bytes) set for each destination as the guaranteed bandwidth per unit time (a cycle in which update is performed) to a token bucket corresponding to the destination, as the cyclic updating process (refer to N1 in FIG. 2).

Figure 3:
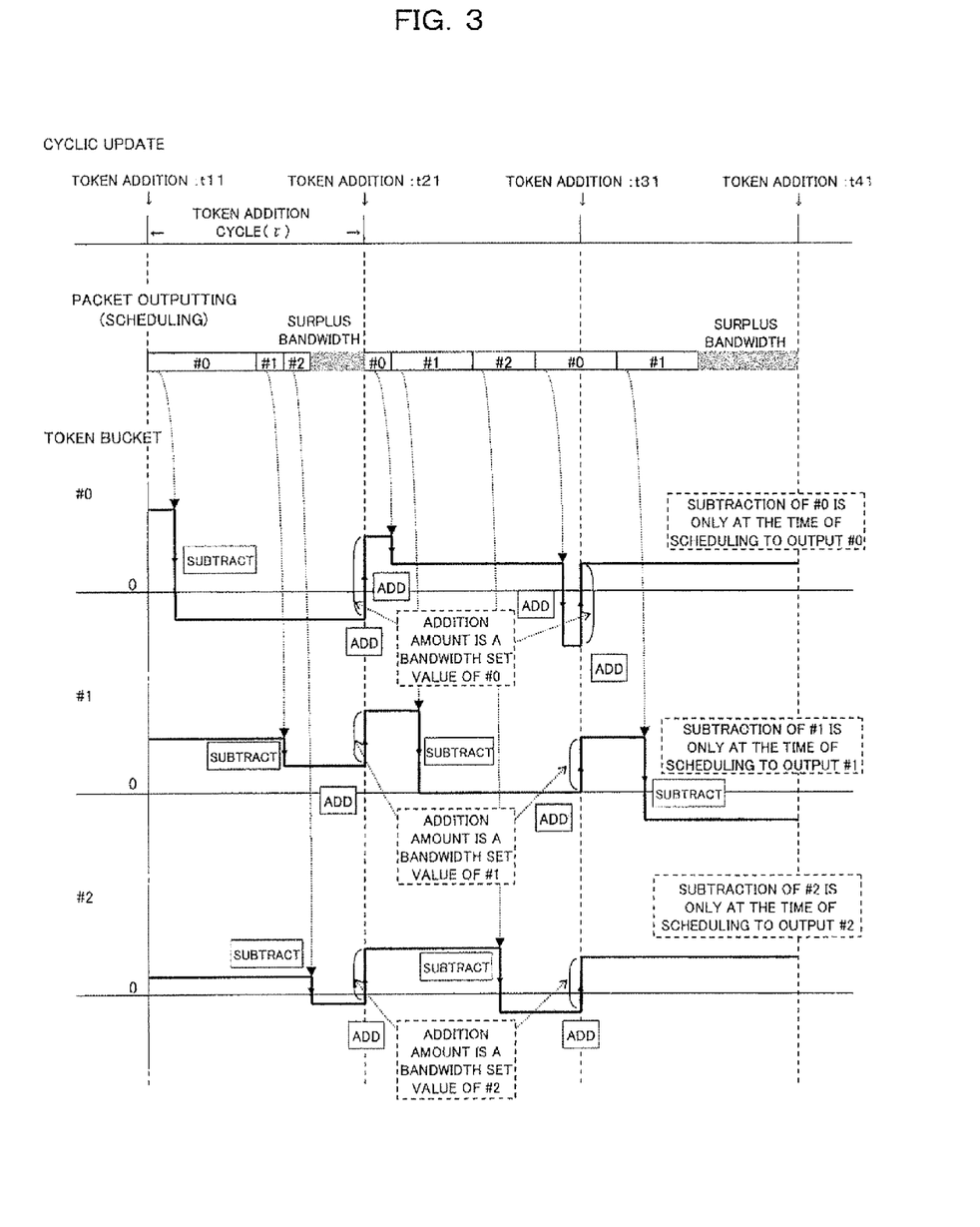
FIG. 3 is a diagram for illustrating a function of the data output apparatus in FIG. 2.

For example, as denoted by t11, t21, t31 and t41 in FIG. 3, the adder 13b updates values of token buckets of all destinations (or queues corresponding thereto) in each cycle τ. In this case, the adder 13b adds a predetermined value set to each destination to the value of a corresponding token bucket, which is a remainder guaranteed bandwidth, of the destination (or corresponding queue) #0, #1 or #2 stored in the memory 13a in each token addition cycle τ, thereby to update the value.

The bandwidth management controller 13 then updates the value of each token bucket, which is the remainder guaranteed bandwidth, on the basis of read queue information and packet length information notified from the read controller 11c. In concrete, the bandwidth management controller 13 updates the value of the token bucket in the memory 13a to a value obtained by subtracting a bandwidth value (the number of bytes, for example) corresponding to the read packet length from a value stored in the memory 13a, which is a token bucket corresponding to the read queue information, as an updated value of the token bucket (refer to N2 in FIG. 2).

The scheduler 14 notifies the read controller 11c of discrimination information representing whether the instruction is to read out for packet transfer (Non-Skip mode) using a remainder guaranteed bandwidth, or is for packet transfer using a surplus bandwidth. When receiving the discrimination information, the read controller 11c notifies the bandwidth management controller 13 of the discrimination information representing whether or not the transferring process for the read packet is with the use of a remainder guaranteed bandwidth, together with the read queue information and the read packet length.

Namely, when the packet transfer is with the use of a surplus bandwidth, the bandwidth management controller 13 does not need to update the remainder guaranteed bandwidth that the bandwidth management controller 13 manages. Accordingly, the bandwidth management controller 13 does not update the remainder guaranteed bandwidth in such case.

The process of adding to the token buckets by the adder 13b is cyclically performed on all queues, whereas the process of subtracting according to the read update by the subtracter 13c is performed only when the read queue instruction from the scheduler 14 is made in the Non-Skip mode.

Packet Transfer Using Surplus Bandwidth

When transfer (in the Non-Skip mode) using remainder guaranteed bandwidths is completed, packet transfer using a surplus bandwidth is successively performed. When a sum of guaranteed bandwidths of all queue is 7 Gbps in the case where the physical bandwidth of output lines of transfer destinations is 10 Gbps, a surplus, that is, a surplus bandwidth, of 3 Gbps generates on the output lines.

Figure 4:
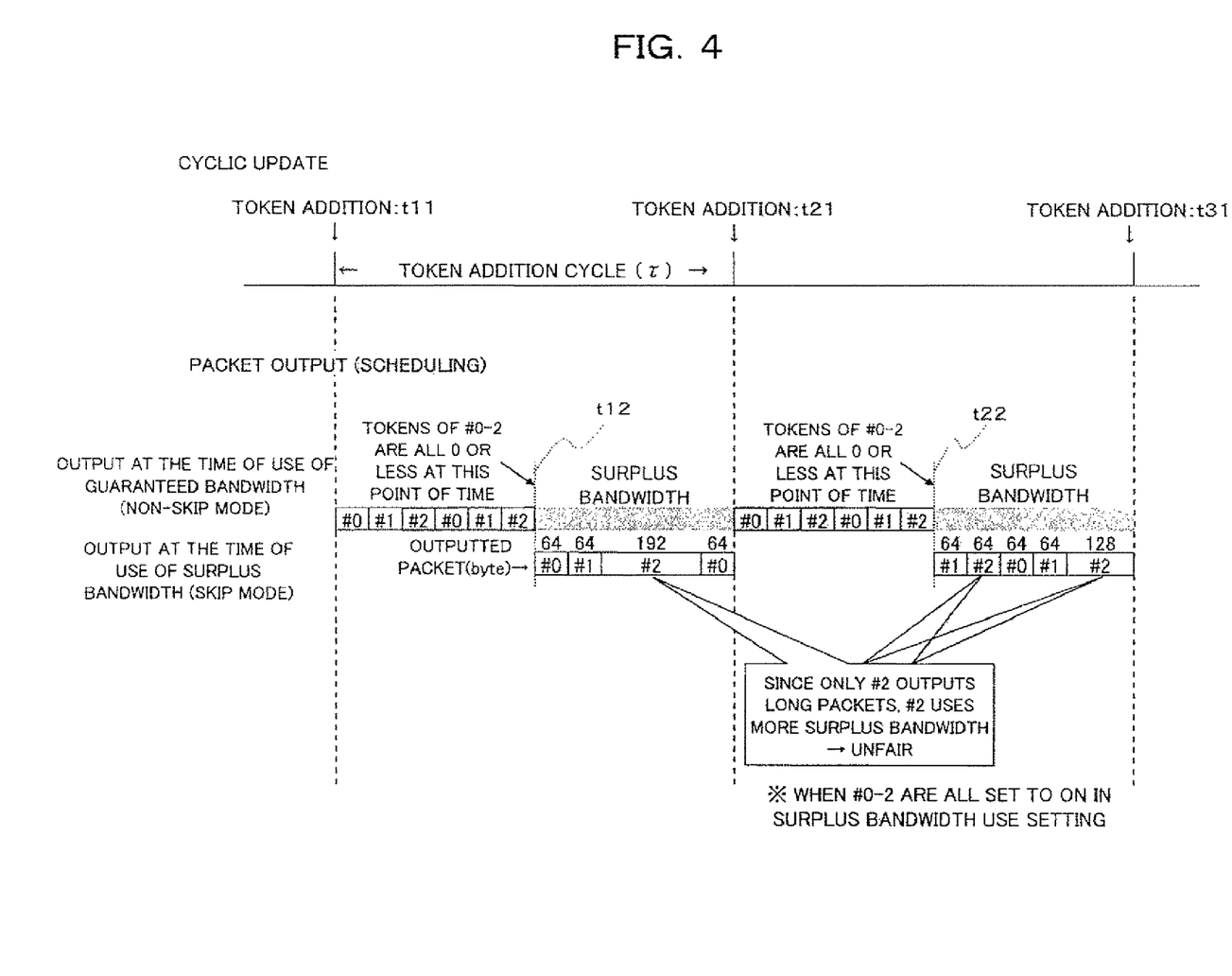
FIG. 4 is a diagram for illustrating another function of the data output apparatus in FIG. 2.

FIG. 4 is a diagram illustrating an example of transfer using remainder guaranteed bandwidths and transfer using a surplus bandwidth thereafter. Token addition is cyclically performed according to the cyclic update (points of time t11, t21 and t31). Between the time when token addition is performed and the time when the next token addition is performed (point of time t11 to t21, and point of time t21 to t31), when values of the token buckets of all queues are "0" or less, or when no packets are stored in the queues (points of time t12 and t22) even if values of the token buckets are larger than "0", a surplus bandwidth generates.

The scheduler 14 performs scheduling using such surplus bandwidth (point of time t12 to t21 t22 to t31. The scheduler 14 gives an instruction about a queue that retains packet data and is permitted to use surplus bandwidth. When there are a plurality of queues retaining packet data, the packet data is outputted, packet by packet.

In this case, packet data of packets retained in the queues #0, #1 and #2 is successively read out. Irrespective of the length of packets to be outputted, the packets are scheduled in the ascending order of the queue number. In this case, the lengths of packet data retained the queues #0 and #1 are relatively short, whereas the length of the packet data retained the queue #2 is relatively long.

As illustrated in FIG. 4, since the output amount is changed according to the length of an outputted packet, the output amount is varied depending on a queue, resulting in unfair output amounts among the queues. In such case, there is possibility that some user can use the surplus bandwidth but another user cannot use the same at all because the former user occupies all the surplus bandwidth. Recent demand is to fairly share the surplus bandwidth among the queues. To attain the fairness, it is necessary to monitor the transfer amount at need to control the flow amount. Since the software cannot attain this control with accuracy, the hardware is required to accomplish the control.

[A2] Data Output Apparatus According to First Embodiment

Figure 5:
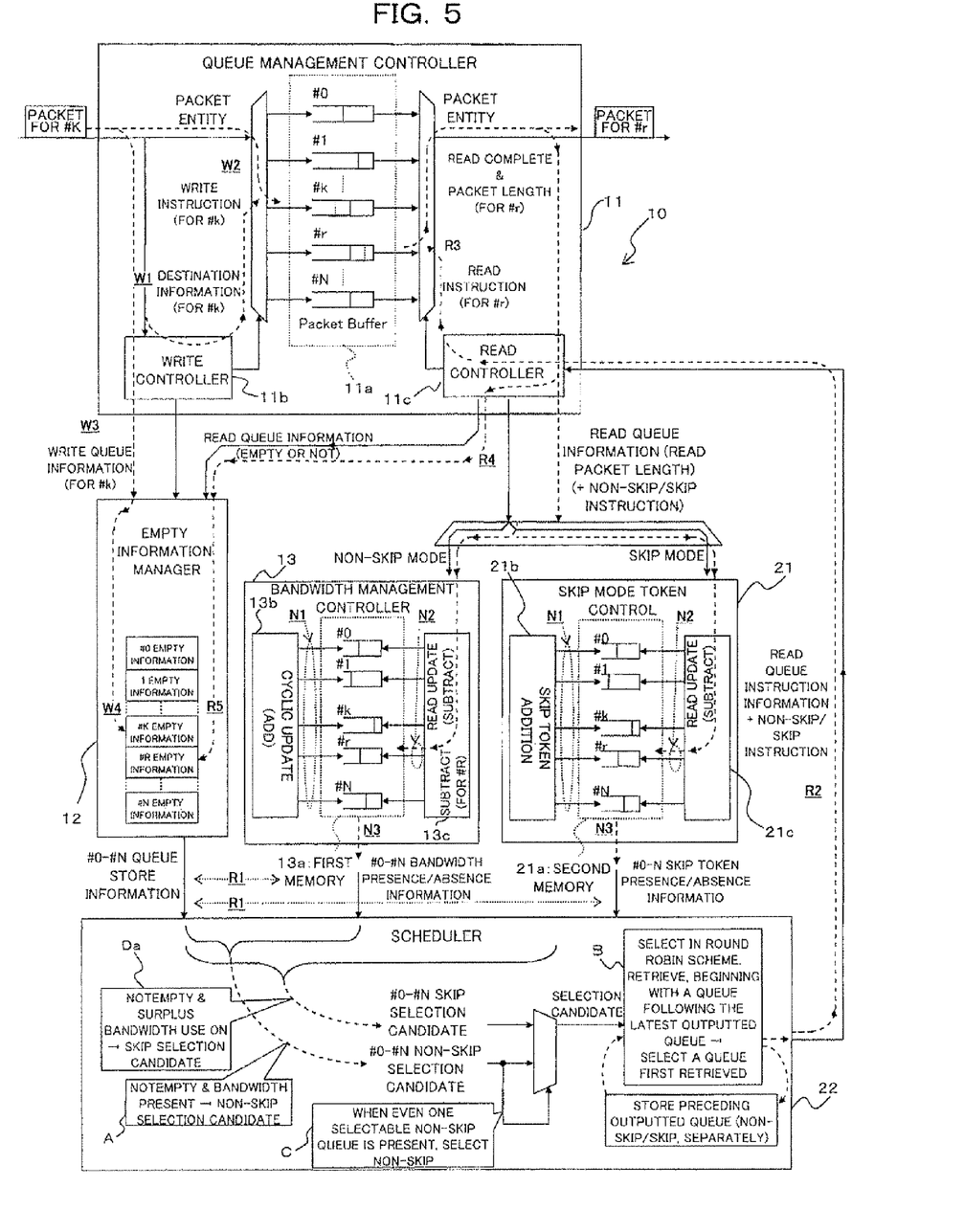
FIG. 5 is a diagram illustrating a data output apparatus according to an embodiment of this invention.

In a first embodiment, a data output apparatus 20 illustrated in FIG. 5 is proposed. In the data output apparatus 10 in FIG. 2, the biased distribution of the output amount among the queues occurring at the time of packet transfer using a surplus bandwidth is caused by packet-by-packet scheduling of the surplus bandwidth. In other words, the biased distribution of a surplus bandwidth is caused by that a queue having outputted a relatively long packet and a queue having outputted a relatively short packet are impartially scheduled in order.

In order to get rid of a difference in output amount due to a difference in the packet length, the data output apparatus 20 illustrated in FIG. 5 monitors and controls the output amount of each queue. In concrete, the data output apparatus 20 differs from the data output apparatus 10 illustrated in FIG. 2 in that the data output apparatus 20 has a surplus bandwidth manager 21 and the scheduler 22 has a different function. Incidentally, like reference characters in FIG. 5 designate like or corresponding parts in FIG. 2.

The queue management controller 11 is a data retainer which is inputted thereto packet data that is output data to the output line from the switch 5 (refer to FIG. 1(b)) and retains the packet data on a per-destination basis. The queue management controller 11 has the packet buffer 11a, the write controller 11b and the read controller 11c. The empty information manager 12 is a retain state manager which manages the retain state of packet data for each of destinations, that is, in each of queues #1 to "N, in the packet buffer 11a.

The bandwidth management controller 13 is an guaranteed bandwidth manager which manages outputting of packet data retained in the packet buffer 11a to the output line within a guaranteed bandwidth given to each destination, on a per-destination basis. In this case, the bandwidth management controller 13 manages a remainder obtained by subtracting an output bandwidth of packet data to the output line having a destination from a guaranteed bandwidth given to the destination, that is, a corresponding queue, as a remainder guaranteed bandwidth (token bucket). Namely, the bandwidth management controller 13 manages a use bandwidth of each queue in the operation mode (remainder guaranteed bandwidth use mode), in which a remainder guaranteed bandwidth is used at the time of packet transfer.

The surplus bandwidth manager 21 manages a use band of each queue in an operation mode (surplus bandwidth use mode) in which a surplus bandwidth is used. Namely, the surplus bandwidth manager 21 manages outputting of packet data retained in the packet buffer 11a to the output line when the packet data is outputted to the output line with the use of a surplus bandwidth that is a surplus left over beyond a sum of guaranteed bandwidths of destinations (surplus bandwidth use mode).

In the remainder guaranteed bandwidth use mode, the scheduler 22 performs the scheduling for a queue to be read out on the basis of the management information fed from the empty information manager 12 and the bandwidth management controller 13 as in the case described hereinbefore with reference to FIG. 2 (refer to a reference character 14). In the surplus bandwidth use mode, the scheduler 22 performs the scheduling for a queue to be read out, with the use of management information fed from the surplus bandwidth manager 21 in addition to the management information fed from the empty information manager 12, unlike the case illustrated in FIG. 2.

Like the case illustrated in FIG. 2, the bandwidth management controller 13 has the first memory 13a, the first adder 13b and the first subtracter 13c. The first memory 13a stores a value of the remainder guaranteed bandwidth of each destination (each queue).

The first adder 13b periodically updates values of the remainder guaranteed bandwidths. Namely, the first adder 13b adds a value of a guaranteed bandwidth per unit time that each destination is guaranteed to a value of the remainder guaranteed bandwidth of the destination to update the value of the remainder guaranteed bandwidth.

The first subtracter 13c read-updates the value of each remainder guaranteed bandwidth. Namely, the first subtracter 13c subtracts a bandwidth value of data of each destination outputted from a corresponding queue in the packet buffer 11a to the output line from the value of a remainder guaranteed bandwidth of a corresponding destination stored in the first memory 13a to update the value of the remainder guaranteed bandwidth.

The scheduler 22 can perform the scheduling in the remainder guaranteed bandwidth use mode by referring to a remainder guaranteed bandwidth of each destination stored in the first memory 13a.

When it is found as a result of management by the bandwidth management controller 13 that a destination having a remainder guaranteed bandwidth is present and when it is found as a result of management of the retain states by the empty information manager 12 that packet data having this destination is retained in the data buffer 11a, the scheduler 22 can perform scheduling to preferentially output this packet data having the destination to the output line (remainder guaranteed bandwidth use mode).

To the contrary, when remainder guaranteed bandwidths of all queues managed by the bandwidth management controller 13 are used up before the next addition timing to add by the first adder 13b comes, a surplus bandwidth generates. So, the data output apparatus 20 uses the surplus bandwidth to output packet data to the output line with the use of the surplus bandwidth (surplus bandwidth use mode).

As described hereinbefore, the data output apparatus 10 illustrated in FIG. 2 performs packet-by-packet scheduling to read out packet data from the queues and transfers the packet data when using the surplus bandwidth. However, the packet length retained in each queue largely affects on a bandwidth used by each queue in the surplus bandwidth. For this reason, fair distribution and unbiased use of the surplus bandwidth among queues is desirable.

In the data output apparatus 20 illustrated in FIG. 5, the surplus bandwidth manager 21 manages transfer of packet data with the use of a surplus bandwidth on a per-destination basis (per retained queue) to avoid occurrence of biased use of the surplus bandwidth among the destinations.

The surplus bandwidth manager 21 manages an output bandwidth of packet data having a destination to the output line as a surplus output bandwidth when the packet data is outputted to the output line with the use of a surplus bandwidth that is a surplus left over beyond a sum of guaranteed bandwidths of destinations. In concrete, the surplus bandwidth manager 21 manages the surplus bandwidth as a difference value between the set bandwidth set for each destination and the output bandwidth. For this purpose, the surplus bandwidth manager 21 has a second memory 21a, a second adder 21b and a second subtracter 21c.

The set bandwidth for each destination mentioned above is to adjust the surplus output bandwidth of each destination through scheduling performed by the scheduler 22, which is set in various setting modes as described hereinafter. The second memory 21a stores a difference value between the set bandwidth set for each destination and the surplus output bandwidth as a remainder set bandwidth value.

The second adder 21b adds a value of the set bandwidth set for each destination to a value of the remainder set bandwidth of a corresponding destination stored in the second memory 21a to update the remainder set bandwidth value. In the first embodiment, a common value is used as a value of the set bandwidth to be added for each destination. Unlike the first adder 13b which cyclically performs addition, the second adder 21b performs addition when values of the remainder set bandwidths for all destinations stored in the second memory 21a become "0" or less, taking this as an opportunity.

The second subtracter 21c subtracts a value of the surplus output bandwidth from a value of the remainder set bandwidth of a corresponding destination stored in the second memory 21a when packet data is outputted to the output line with the use of a bandwidth (surplus bandwidth) left over beyond a sum of the guaranteed bandwidths.

The scheduler 22 refers to the remainder guaranteed bandwidth value of each queue stored in the first memory 13a, and performs scheduling with the use of the surplus bandwidth when the remainder guaranteed bandwidth of the queues have been used up. The scheduler 22 determines a queue that the scheduler 22 instructs to read out its packet data retained in the packet buffer 11a according to the remainder set bandwidths stored in the second memory 21a and the packet retain state of the queues managed by the empty information manager 12. The scheduler 22 gives an instruction to read out packet data from the determined queue to the read controller 11c to transfer the packet data (refer to Da in FIG. 5).

When it is found as a result of management of the remainder guaranteed bandwidths by the bandwidth management controller 13 that no destinations having remainder guaranteed bandwidths are present, and when it is found as a result of management of the surplus output bandwidths by the surplus bandwidth manager 21 that a destination whose surplus output bandwidth falls within the use set bandwidth, and when it is found as a result of management of the retain state by the empty information manager 12 that packet data having this destination is retained in the packet buffer 11a, the scheduler 22 performs scheduling to output the packet data having the destination to the output line.

The data output apparatus 20 comprised of the elements 11 to 13, 21 and 22 described above can be accomplished with hardware. Therefore, it becomes possible to distribute use bandwidths of queues with relatively high accuracy under management of the bandwidths by the bandwidth management controller 13 and the surplus bandwidth manager 21, in reading out a packet with the use of the remainder guaranteed bandwidth or in reading out a packet with the use of the surplus bandwidth.

Figure 6:
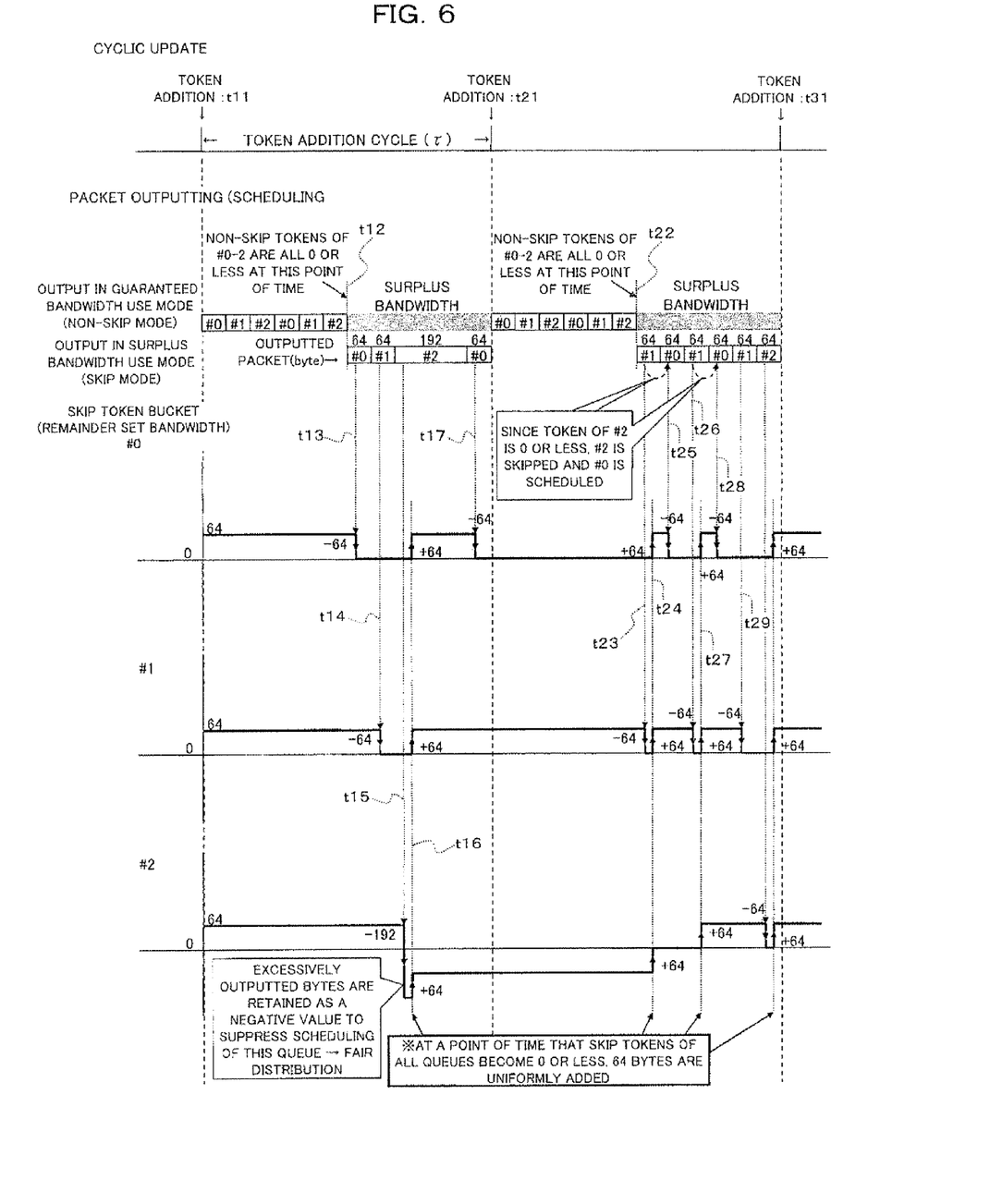
FIG. 6 is a diagram for illustrating a function according to a first embodiment.

FIG. 6 is a time chart illustrating an example of packet reading mode in the data output apparatus 20 illustrated in FIG. 5, paying attention to the surplus bandwidth use mode, in particular.

The first adder 13b adds an guaranteed bandwidth value to a remainder guaranteed bandwidth of each destination in a cycle of a predetermined time period τ as the cyclic updating process (t11, t21 and t31 in FIG. 6). Whereby, packet data is read out and transfers to a corresponding destination with the use of the remainder guaranteed bandwidth after this cyclic updating process (remainder guaranteed bandwidth use mode, Non-Skip mode). In this case, packet data having destinations #0 to #2 are transferred in the round robin scheme on the basis of remainder guaranteed bandwidths of the respective destinations #0 to #2 through scheduling by the scheduler 22 (t11 to t12 and t21 to t22 in FIG. 6).

When all the remainder guaranteed bandwidth values of the destinations stored in the first memory 13a become equal to or less than "0" (t12 and t22 in FIG. 6), the scheduler 22 performs scheduling for packet transfer with the use of the surplus bandwidth. In concrete, the scheduler 22 refers to the second memory 21a and the empty information manager 12, and gives an instruction to read out a destination having a remainder set bandwidth and whose queue retains packet data. When plural queues are applicable, the scheduler 22 successively reads out the queues in the round robin scheme (t12 to t21 and t22 to t31 in FIG.

When receiving the read instruction from the scheduler 22, the read controller 11c reads out packet data from the instructed queue and outputs (transfers) the packet data to the output line. On this occasion, the second subtracter 21c of the surplus bandwidth manager 21 subtracts the remainder set bandwidth (Skip token bucket) to update (read update) the same because the packet transfer is with the use of a surplus bandwidth.

In this case, bandwidths corresponding to lengths of the read-out packet data are subtracted from the remainder set bandwidths each of 64 bytes in the queues #0 to #2 in the second memory 21a, respectively. For example, in the surplus bandwidth use mode from t12 to t21, the lengths of packet data read out from the queues #0 and #1 are both 64 bytes, hence the remainder set bandwidths thereof are both "0" as a result of the read update (t13 and t14). On the other hand, the length of the packet data read out from the queue #2 is 192 bytes, hence the remainder set bandwidth thereof is −128 bytes as a result of the read update (t15).

Since all the remainder set bandwidths of these queues are "0" or less at this time, the second adder 21b adds to update the remainder set bandwidths, taking this as an opportunity. In concrete, the second adder 21b adds 64 bytes to each of the remainder set bandwidths of the destinations #0 to #2. As a result, the remainder set bandwidths of the queues #0 to #2 both are 64 bytes, and the remainder set bandwidth of the queue #2 is −64 bytes (t16).

In the surplus bandwidth use mode, the scheduler 22 performs scheduling so as to preferentially read out packet data retained in a queue having a remainder set bandwidth (larger than "0"). After packet data in the queue #2 illustrated in FIG. 6 longer than packet data in other queues #0 and #1 are read out, the priority of the queue #2 is lowered, leading to unbiased use of the surplus bandwidth.

In concrete, after the packet data of 192 bytes is read out from the queue #2, the remainder set bandwidth of the queue #2 remains not larger than "0" until add-updating is performed three times (t16, t24 and t27). Thus, packet data retained in the queue #2 is not read out until the remainder set bandwidth of the queue #2 becomes larger than "0", but packet data retained in the queues #0 and #1 are read out (t17, t23, t25 and t26).

In the case in FIG. 6, the remainder set bandwidths of the queues #0 to #2 all become 64 bytes owing to the add-update at t27. On this occasion, all the queues are in the retain state, hence packet data retained in the queues #0 to #2 are successive read out in order.

When comparing the bandwidth use amounts of the queues with one another during two time periods t12 to t21 and t22 to t31 as a time period of the surplus bandwidth use mode, it is found that 256 bytes are fairly distributed. As this, it becomes possible to fairly distribute the use bandwidths of the queues through the bandwidth management by the surplus bandwidth manager 21.

As stated above, the data output apparatus 20 accomplished by hardware according to the first embodiment can advantageously distribute the use bandwidths of queues within the surplus bandwidth, accurately and fairly, on the basis of set bandwidth set to each of the queues.

In the case in FIG. 6, it is supposed that packet data in the queues #0 to #2 is continuously in the retain state. In the data output apparatus 20, when it is found on the basis of the retain state managed by the empty information manager 12 that a queue whose packet data becomes the non-retain state, a remainder guaranteed bandwidth (token bucket) of this queue can be cleared in the first memory 13a. In concrete, the bandwidth management controller 21 has a function of changing a value of the remainder guaranteed bandwidth of a queue that becomes the non-retain state to "0" in the empty information manager 12. Accordingly, the scheduler 22 does not make an instruction to read out packet data of a queue not retaining packet data.

[b] Second Embodiment

In the first embodiment, an equal value is added to each queue as the use set bandwidth to be added by the second adder 21b. As the use set bandwidth, values differing from queue to queue are adoptable.

According to a second embodiment, values of the use set bandwidths for queues to be added by the second adder 21b have a predetermined ratio. The data output apparatus 20 is comprised of the elements 11 to 13, 21 and 22 like the first embodiment, but differs from the data output apparatus 20 in that the function of the second adder 21b of the surplus bandwidth manager 21 is different. Elements other than the above elements are basically the same as those in the above-mentioned first embodiment.

In the second embodiment, the use set bandwidths of the queues #0, #1 and #2 are 128, 64 and 64 bytes, respectively. In other words, the use set bandwidths of the queues #0, #1 and #2 have a ratio of 2:1:1.

Figure 7:
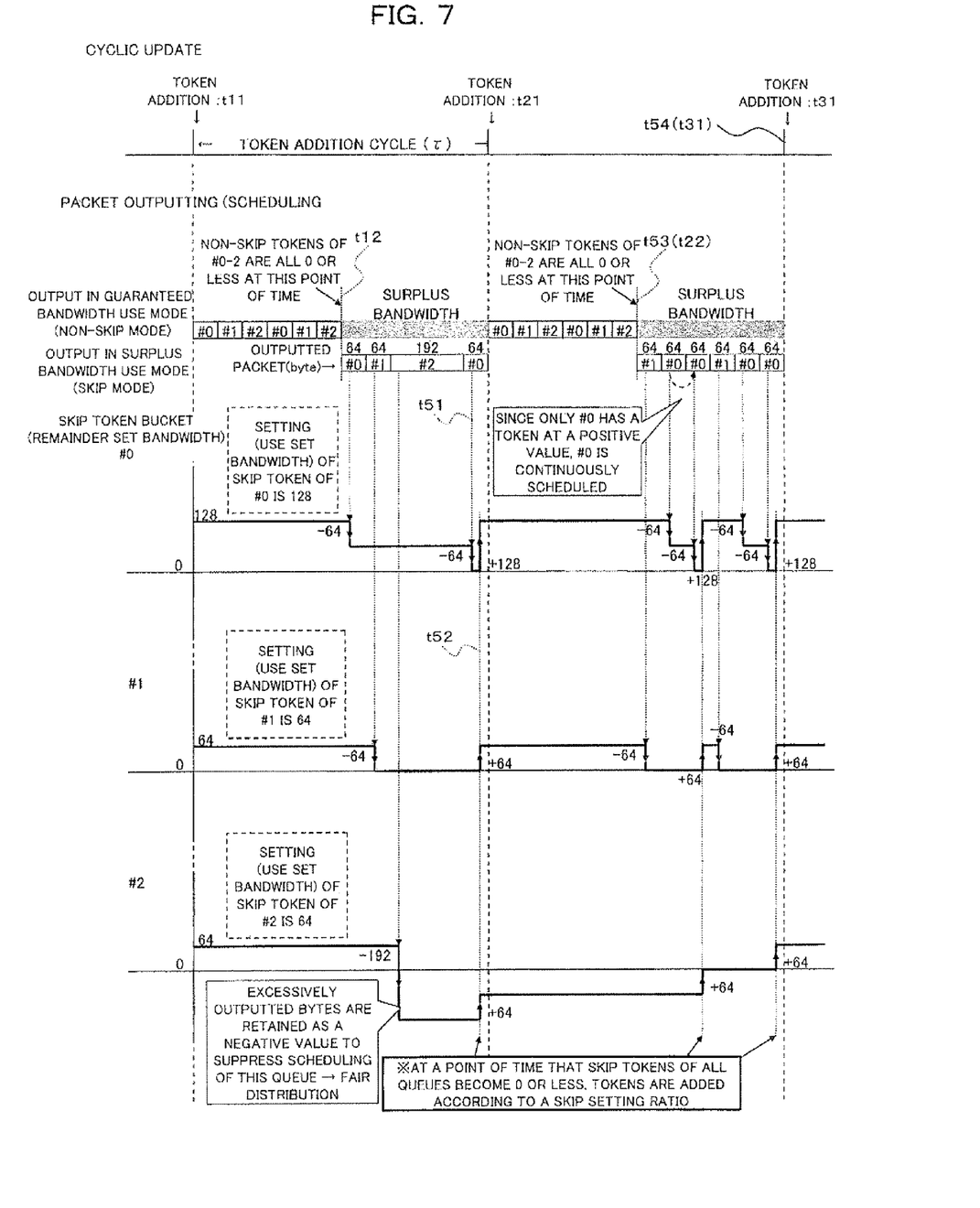
FIG. 7 is a diagram for illustrating a function according to a second embodiment.

FIG. 7 is a time chart illustrating an example of mode of packet reading in the data output apparatus 20 (refer to FIG. 5) according to the second embodiment, paying attention to the surplus bandwidth use mode, in particular.

Like the preceding embodiment, remainder guaranteed bandwidths are updated in a cycle of a predetermined time τ by the cyclic update (t11, t21 and t31 in FIG. 7). After the cyclic updating process, packet data is read out and transferred to respective destination with the use of remainder guaranteed bandwidths (t11 to t12, and t21 to t22 in FIG. 7).

When remainder guaranteed bandwidths of respective destinations stored in the first memory 13a all become "0" or less (t12 and t22 in FIG. 6), the scheduler 22 performs scheduling for packet transfer with the use of a surplus bandwidth, like the first embodiment.

In the second embodiment, when remainder set bandwidths of queues all become "0" or less, the second adder 21b (refer to FIG. 5) adds to update the remainder set bandwidths, taking this as an opportunity. Unlike the first embodiment, the second adder 21b adds 128 bytes, 64 bytes and 64 bytes to the remainder set bandwidths of the queues #0, #1 and #2, respectively, to update the remainder set bandwidths stored in the second memory 21a.

For example, at a point of time t51, the remainder set bandwidth values of all the queues #0 to #2 are "0". Taking this as an opportunity, the second adder 21b adds the above use set bandwidths to the remainder set bandwidths of the queues #0, #1 and #2. Whereby, the remainder set bandwidths stored in the second memory 21a become 128 bytes in the queue #0, 64 bytes in the queue #1 and 64 bytes in the queue #2 (t52).

In a section from t53 to t54 in the surplus bandwidth use mode thereafter, the queue #0 is distributed 256 bytes, whereas the queues #1 and #2 are distributed 128 bytes each. In other words, the surplus bandwidth can be distributed according to the ratio of the use set bandwidths.

According to the second embodiment, the data output apparatus accomplished with hardware can advantageously distribute use bandwidths to queues within a surplus bandwidth on the basis of the set bandwidths set to the respective queues, while giving appropriate weights to the queues.

[c] Third Embodiment

In the first and second embodiment described above, all the surplus bandwidth is distributed to queues, uniformly or in a certain ratio. Aside from the above examples, another system can be supposed, in which packets for control in a predetermined amount are flown together with user packets with the use of a surplus bandwidth. In such system, it is demanded to distribute the surplus bandwidth to user packets while securing flow of the packets for control.

According to a third embodiment, the second adder 21b (refer to FIG. 5) adds to update the set bandwidths in a predetermined cycle in the surplus bandwidth use mode (Skip mode) in the same manner as the guaranteed bandwidth use mode. As values to be added to respective remainder set bandwidths in such occasion, different values of the use set bandwidths are employable.

Figure 8:
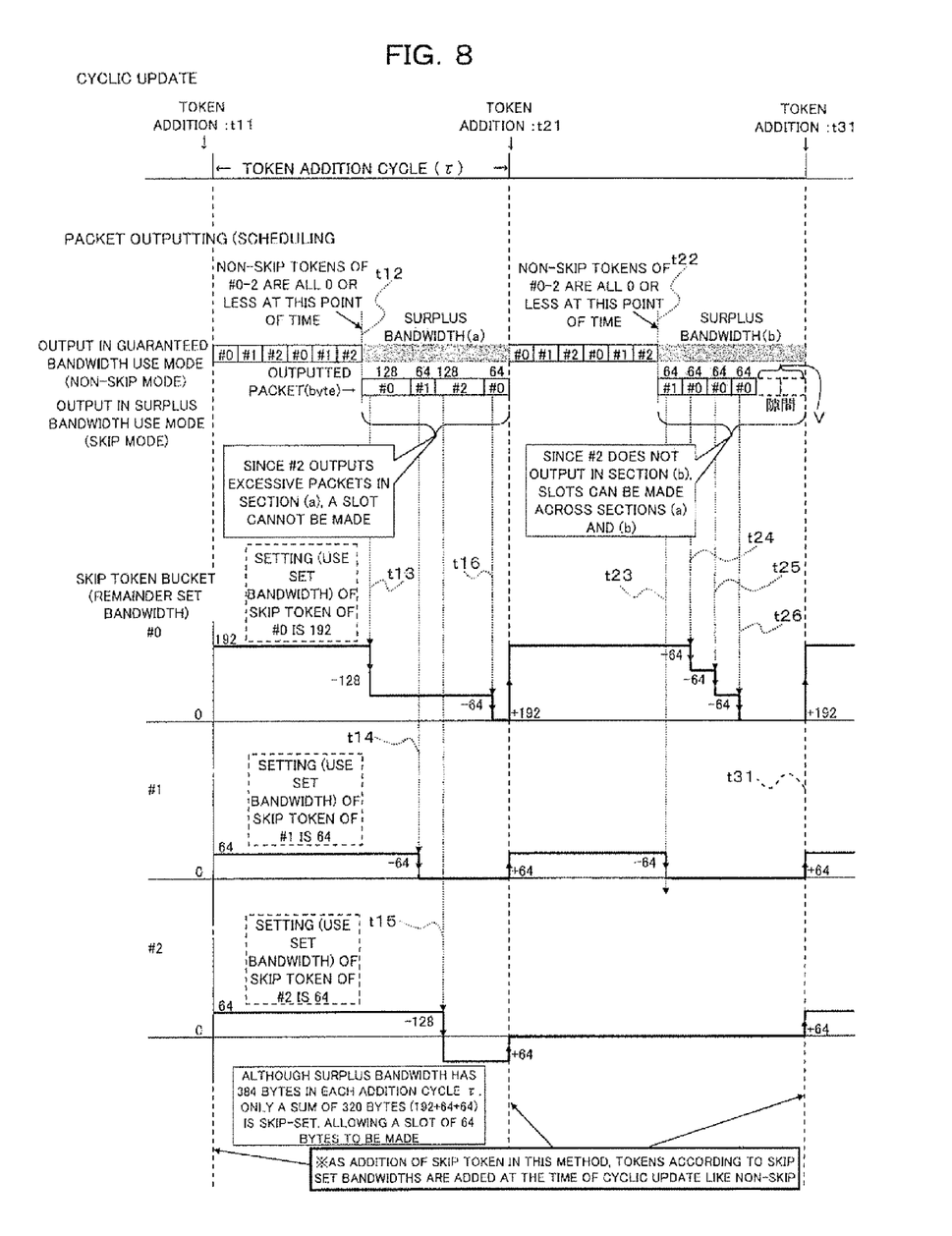
FIG. 8 is a diagram for illustrating a function according to a third embodiment.

FIG. 8 is a time chart illustrating an example of mode of packet reading in the data output apparatus 20 (refer to FIG. 5) according to the third embodiment, paying attention to the surplus bandwidth use mode, in particular.

In the second embodiment, as illustrated in FIG. 7, a section of 384 bytes (t12 to t21 and t22 to t31) is present as the surplus bandwidth in each cycle r for cyclic update (t11, t21 and t31) of the remainder guaranteed bandwidths. In the third embodiment, when the remainder set bandwidth of each queue is added to be updated, the remainder set bandwidth is added and updated in the same cycle as the cyclic update of the remainder guaranteed bandwidth.

In other words, in the third embodiment, the remainder set bandwidth is added to be updated in a predetermined cycle τ irrespective of whether or not the values of remainder set bandwidths of the queues are "0" or less. Values of the use set bandwidths to be added and updated by the second adder 21b as the remainder set bandwidths of the queues are 192 bytes for the queue #0, 64 bytes for the queue #1 and 64 bytes for the queues #2 in each unit cycle τ, for example.

Accordingly, it is possible to set a slot of bandwidth of 64 bytes (384−(192+64+64)=64 bytes) in a unit cycle τ that can be used by packet other than user packet. The packet for control or the like is flown with the use of the above slot bandwidth, whereby the surplus bandwidth can be distributed to user packets of destinations without affecting on the flow of a constant amount of the packet for control.

In the case illustrated in FIG. 8, 192 bytes, 64 bytes and 64 bytes are given as the remainder set bandwidths of the queues #0, #1 and #2, respectively, in the first section t12 to t21 of the surplus bandwidth. In this case, packet data with a length of 128 bytes is scheduled from the queue #0, packet data with a length of 64 bytes from the queue #1, and packet data with a length of 128 bytes from the queue #2, successively, with the use of the surplus bandwidth (t13, t14 and t15). On this occasion, the second subtracter 21c subtracts a length of the packet from a value of the remainder set bandwidth of a corresponding queue at a timing of reading the packet, and updates (read-updates) the remainder set bandwidth.

After the update, a value of the remainder set bandwidth of the queue #0 is kept at a positive value (64 bytes) in the remaining surplus bandwidth. For this, the scheduler 22 gives an instruction to read packet data (64 bytes, here) retained in the queue #0 (t16). As the unit cycle τ has just elapsed on this occasion, the adder 13b adds the guaranteed bandwidth to the remainder guaranteed bandwidth to update the same, whereas the second adder 21b adds the use set bandwidth to update the remainder set bandwidth (t21).

In a section t12 to t21 of the surplus bandwidth, user packets of 384 bytes in total (128+64+128+64=384 bytes) are outputted. Accordingly, the surplus bandwidth is all occupied by the user packets. This is caused by that packet data read out from the queue #2 has a packet length exceeding 64 bytes as the use set bandwidth. As a result, no bandwidth to flow the packet for control is secured in this section.

In the third embodiment, the insufficient bandwidth for flow of the packet for control can be compensated in the next surplus bandwidth section t22 to t31. Namely, in the next surplus bandwidth section t22 to t31, packet data of 64 bytes is scheduled from the queue #1 in the surplus bandwidth use mode (t23).

At this time, a value of the remainder set bandwidth of the queue #2 is zero byte (−64 bytes+64 bytes=0 byte) even by the update (t21) of the remainder set bandwidth immediately before, not restoring to a positive value. For this reason, scheduling for reading packet data retained in the queue #2 is not performed, but packet data (64 bytes in length) retained in the queue #0 is scheduled (t24).

Next, since values of the remainder set bandwidths of the queues #1 and #2 are both zero or less, packet data retained in the queue #0 is successively scheduled until the value of the remainder set bandwidth of the queue #0 becomes zero or less (t25, t26). When the remainder set bandwidth of the queue #0 becomes zero, values of the remainder set bandwidths of all the queues #0 to #2 become zero. Thereafter, scheduler 22 does not perform user packet scheduling of user packets until the values of the remainder set bandwidths are next added and updated (t31).

In the surplus bandwidth section t22 to t31, a slot bandwidth V corresponding to (64×2) bytes (384−(64+64+64+64)= (64×2) bytes) can be made after scheduling based on the remainder set bandwidth of user packets. Namely, two slot bandwidths each of 64 bytes can be provided across the two surplus bandwidth sections t12 to t21 and t22 to t31. In other words, a slot section of 64 bytes can be provided to flow the packet for control, correspondingly to the number of the surplus bandwidth sections.

As stated above, the third embodiment can provide the same advantages as the above first and second embodiments. In addition, the third embodiment provides an advantage that it is possible to secure a bandwidth for flow of another packet such as a packet for control or the like without occupying all the surplus bandwidth by user packets, which can flexibly cope with a system to be configured.

Since each queue can have the guaranteed bandwidth and the use set bandwidth in the surplus bandwidth, separately, it is possible to provide a carefully though out service according to the guaranteed bandwidth use mode and the surplus bandwidth use mode on a per-queue basis, whereby the user can choose appropriate setting according to application of packets.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A data output apparatus comprising:
a data memory retainer that retains inputted output data to an output line for each destination thereof;
a retain state manager that manages a retain state of the output data for each destination in said data memory retainer;
a guaranteed bandwidth manager that manages outputting of the output data to the output line retained in said data memory retainer within a guaranteed bandwidth given to the destination on a per-destination basis;
a surplus bandwidth manager that manages the outputting of the output data to the output line retained in said data memory retainer on the per-destination basis when the output data is outputted to the output line by using a surplus bandwidth that is a surplus over a sum of the guaranteed bandwidths; and
a scheduler that schedules outputting of data retained in said data memory retainer to the output line, based on results of managements by said guaranteed bandwidth manager and said surplus bandwidth manager and the retain state managed by said retain state manager, wherein
said guaranteed bandwidth manager manages a remainder guaranteed bandwidth that is obtained by subtracting an output bandwidth of output data having a destination to the output line from a guaranteed bandwidth given to the destination; and
when the output data is outputted to the output line by using the surplus bandwidth, said surplus bandwidth manager manages a surplus output bandwidth that is an output bandwidth of output data having a destination to the output line with respect to a bandwidth usage setting set for each the destination.

2. The data output apparatus according to claim 1, wherein when it is found as a result of management by said guaranteed bandwidth manager that a destination having the remainder guaranteed bandwidth is present, and when it is found as a result of management of the retain state by said retain state manager that output data having the destination is retained in said data memory retainer, said scheduler performs scheduling to preferentially output the output data having the destination to the output line.

3. The data output apparatus according to claim 2, wherein when a plurality of data having different destinations are retained as output data having the destinations in said data memory retainer, said scheduler performs scheduling to successively output the plurality of data to the output line.

4. The data output apparatus according to claim 1, wherein when it is found as a result of management of the remainder guaranteed bandwidths by said guaranteed bandwidth manager that a destination having the remainder guaranteed bandwidth is not present, and when it is found as a result of management of the surplus output bandwidths by said surplus bandwidth manager that a destination whose surplus output bandwidth falls within a range of the use set bandwidth is present, and when it is found as a result of management of the retain state by said retain state manager that output data having the destination is retained in said data memory retainer, said scheduler performs scheduling to output data having the destination to the output line.

5. The data output apparatus according to claim 4, wherein when a plurality of data having different destinations are retained as output data having the destinations in said data memory retainer, said scheduler performs scheduling to successively output the plurality of data to the output line.

6. The data output apparatus according to claim 1, wherein said guaranteed bandwidth manager comprises:
a first memory that stores a value of the remainder guaranteed bandwidth on the per-destination basis;
a first adder that adds a value of the guaranteed bandwidth per unit time that is guaranteed to a destination to a value of the remainder guaranteed bandwidth of the destination stored in said first memory to update the value of the remainder guaranteed bandwidth; and
a first subtracter that subtracts a bandwidth value of a destination of data outputted from said data memory retainer to the output line from a value of the remainder guaranteed bandwidth of the destination stored in said first memory to update the value of the remainder guaranteed bandwidth.

7. The data output apparatus according to claim 1, wherein said surplus bandwidth manager comprises:
- a second memory that stores a difference value obtained by subtracting the surplus output bandwidth from the use set bandwidth as a remainder set bandwidth value on the per-destination basis;
- a second adder that adds a value of the use set bandwidth set for a destination to the remainder set bandwidth value of the destination stored in said second memory; and
- a second subtracter that when the output data is outputted to the output line by using a bandwidth that is a surplus over a sum of the guaranteed bandwidths, subtracts a value of the surplus output bandwidth from the remainder set bandwidth value of a corresponding destination stored in said second memory.

8. The data output apparatus according to claim 7, wherein when values of the remainder set bandwidths of all destinations stored in said second memory are zero or less, said second adder performs addition.

9. The data output apparatus according to claim 7, wherein said second adder periodically adds a value of a bandwidth per unit time as a value of the use set bandwidth to be added to a value of the remainder set bandwidth of each destination.

10. The data output apparatus according to claim 1, wherein values of the use set bandwidth set for destinations are a bandwidth value common to the destinations.

11. The data output apparatus according to claim 1, wherein values of the use set bandwidths set for destinations have a predetermined ratio.

12. The data output apparatus according to claim 1, wherein the data is packet data.

13. A communication apparatus comprising said data output apparatus according to claim 1.

14. A switch apparatus comprising:
- a plurality of communication apparatuses connected to a packet network;
- a Layer 2 switch connected among said plural communication apparatuses;
- at least one of said plural communication apparatuses comprising:
  - a data output apparatus comprising:
    - a data memory retainer that retains inputted output data to an output line forming the accommodating packet network from said Layer 2switch, for each destination thereof;
    - a retain state manager that manages a retain state of the output data for each destination retained in said data memory retainer;
    - a guaranteed bandwidth manager that manages outputting of the output data to the output line retained in said data memory retainer within a guaranteed bandwidth given to each destination on a per-destination basis;
    - a surplus bandwidth manager that when the output data is outputted to the output line by using a surplus bandwidth that is a surplus over a sum of the guaranteed bandwidths, manages the outputting of the output data to the output line retained in said data memory retainer on the per-destination basis; and
    - a scheduler that schedules outputting of data to the output line retained in said data memory retainer, based on results of managements by said guaranteed bandwidth manager and the surplus bandwidth manager and the retain state managed by said retain state manager, wherein
- said guaranteed bandwidth manager manages a remainder guaranteed bandwidth that is obtained by subtracting an output bandwidth of output data having a destination to the output line from a guaranteed bandwidth given to the destination; and
- when the output data is outputted to the output line by using the surplus bandwidth, said surplus bandwidth manager manages a surplus output bandwidth that is an output bandwidth of output data having a destination to the output line with respect to a bandwidth usage setting set for each the destination.

* * * * *